United States Patent [19]

Boyd et al.

[11] Patent Number: 5,046,369

[45] Date of Patent: Sep. 10, 1991

[54] COMPENSATED TURBINE FLOWMETER

[75] Inventors: Charles L. Boyd; Steven L. Skinner, both of Duncan, Okla.; Kurt L. Werner, Cupertino, Calif.

[73] Assignee: Halliburton Company, Duncan, Okla.

[21] Appl. No.: 336,282

[22] Filed: Apr. 11, 1989

[51] Int. Cl.$^5$ ............................................. G01F 1/90
[52] U.S. Cl. .............................. 73/861.03; 73/861.77
[58] Field of Search ........... 73/861.02, 861.03, 861.77, 73/861.78

[56] References Cited

U.S. PATENT DOCUMENTS

| 3,176,514 | 4/1965 | Foster . | |
|---|---|---|---|
| 3,243,112 | 3/1966 | Sorteberg | 235/200 |
| 3,530,715 | 9/1970 | Stiens | 73/233 |
| 3,537,312 | 11/1970 | Moore . | |
| 3,538,766 | 11/1970 | Kugler . | |
| 3,701,280 | 10/1972 | Stroman . | |
| 3,729,995 | 5/1973 | Kovacs et al. . | |
| 3,752,393 | 8/1973 | Moseley | 235/151.34 |
| 3,792,610 | 2/1974 | Koutanis et al. | 73/861.77 |
| 3,950,989 | 4/1976 | Meirowitz | 73/861.77 |
| 4,111,042 | 9/1978 | Bryant . | |
| 4,149,254 | 4/1979 | Molusis | 73/861.03 X |
| 4,326,411 | 4/1982 | Gant et al. | 73/155 |
| 4,390,956 | 6/1983 | Cornforth et al. | 364/510 |
| 4,419,898 | 12/1983 | Zanker et al. | 73/861.02 |
| 4,562,744 | 1/1986 | Hall et al. | 73/861.02 |
| 4,590,805 | 5/1986 | Baird | 73/861.77 X |
| 4,674,316 | 6/1987 | Albrecht et al. | 73/3 |
| 4,697,613 | 10/1987 | Wienck | 137/171 |
| 4,770,212 | 9/1988 | Wienck | 138/45 |
| 4,799,169 | 1/1989 | Mims | 364/510 |

OTHER PUBLICATIONS

Halliburton Services, Sales and Service Catalog, vol. 43, pp. 2576-2579, Mar. 1986.

Primary Examiner—Herbert Goldstein
Attorney, Agent, or Firm—E. Harry Gilbert, III; James R. Duzan; Thomas R. Weaver

[57] ABSTRACT

A temperature and pressure compensated gas flowmeter is provided which reads uncompensated line parameters and outputs a frequency signal representative of the gas flow rate referenced to standard conditions. The frequency signal is compatible with a number of interface devices, such as remote terminal units, field computers and displays. Further, the uncompensated line parameters are also provided to the interface devices such that the compensated frequency signal can be verified.

2 Claims, 6 Drawing Sheets

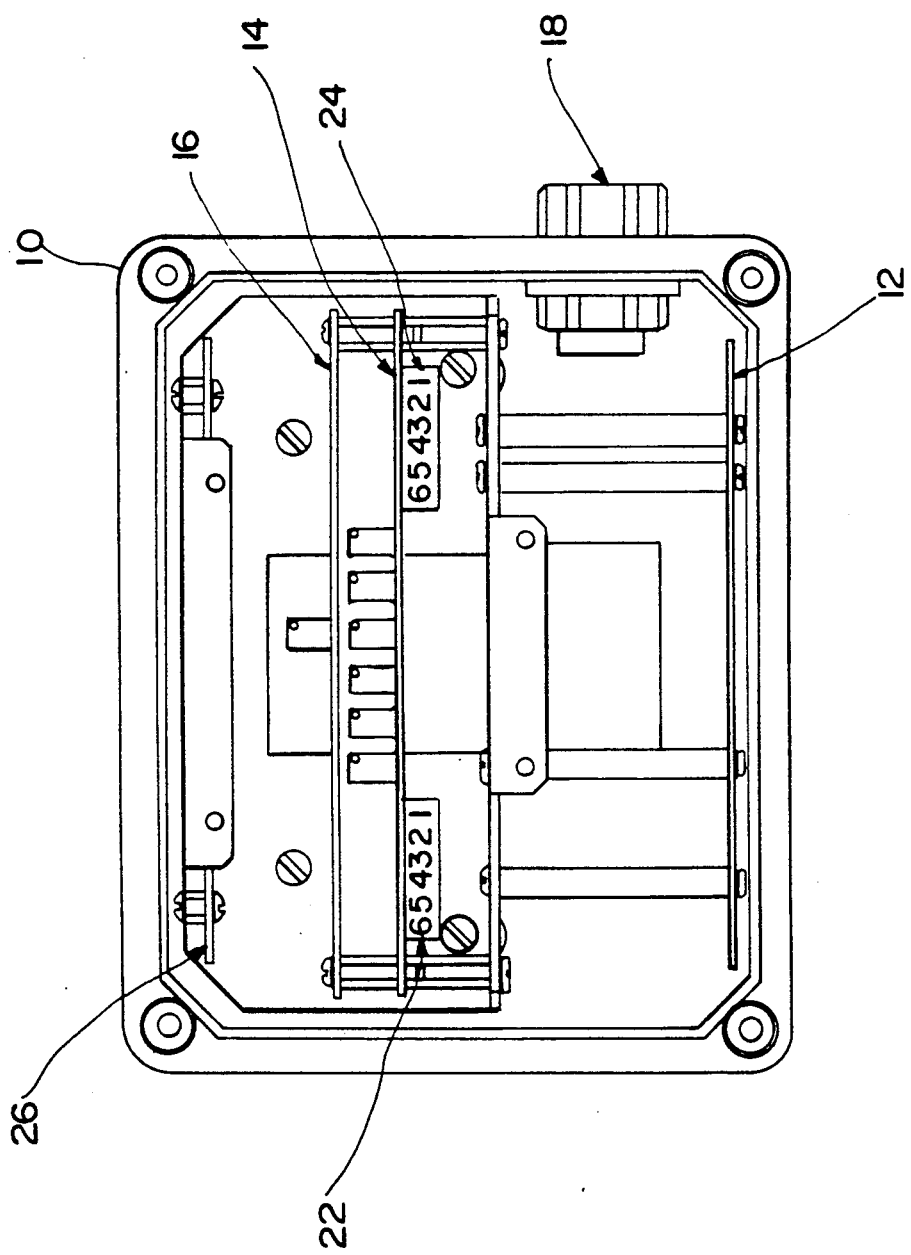

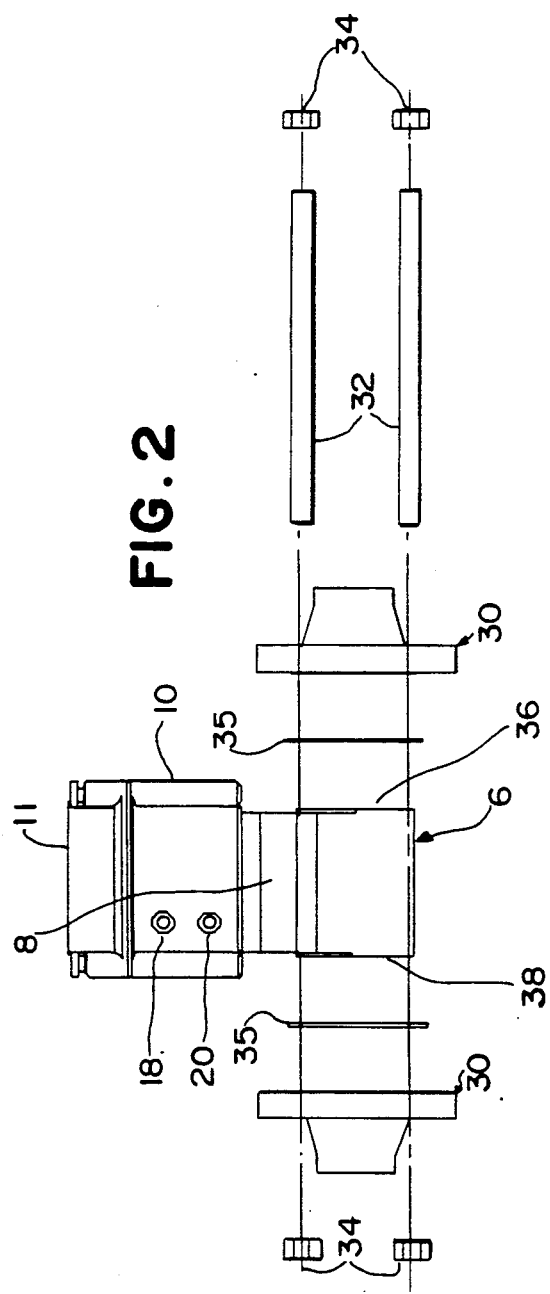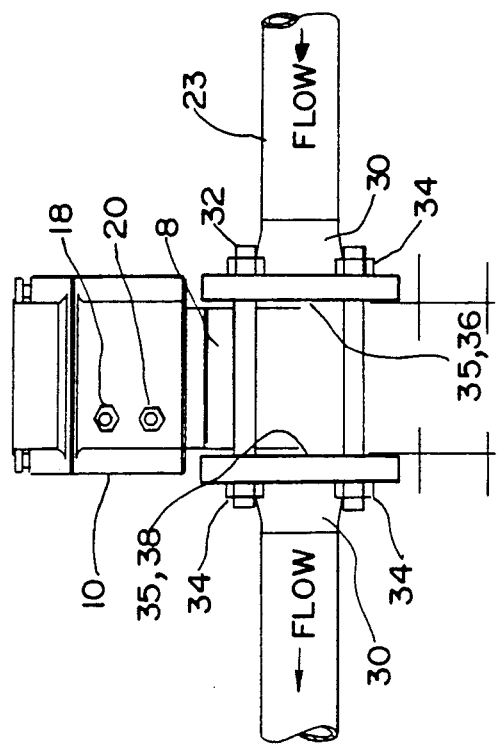

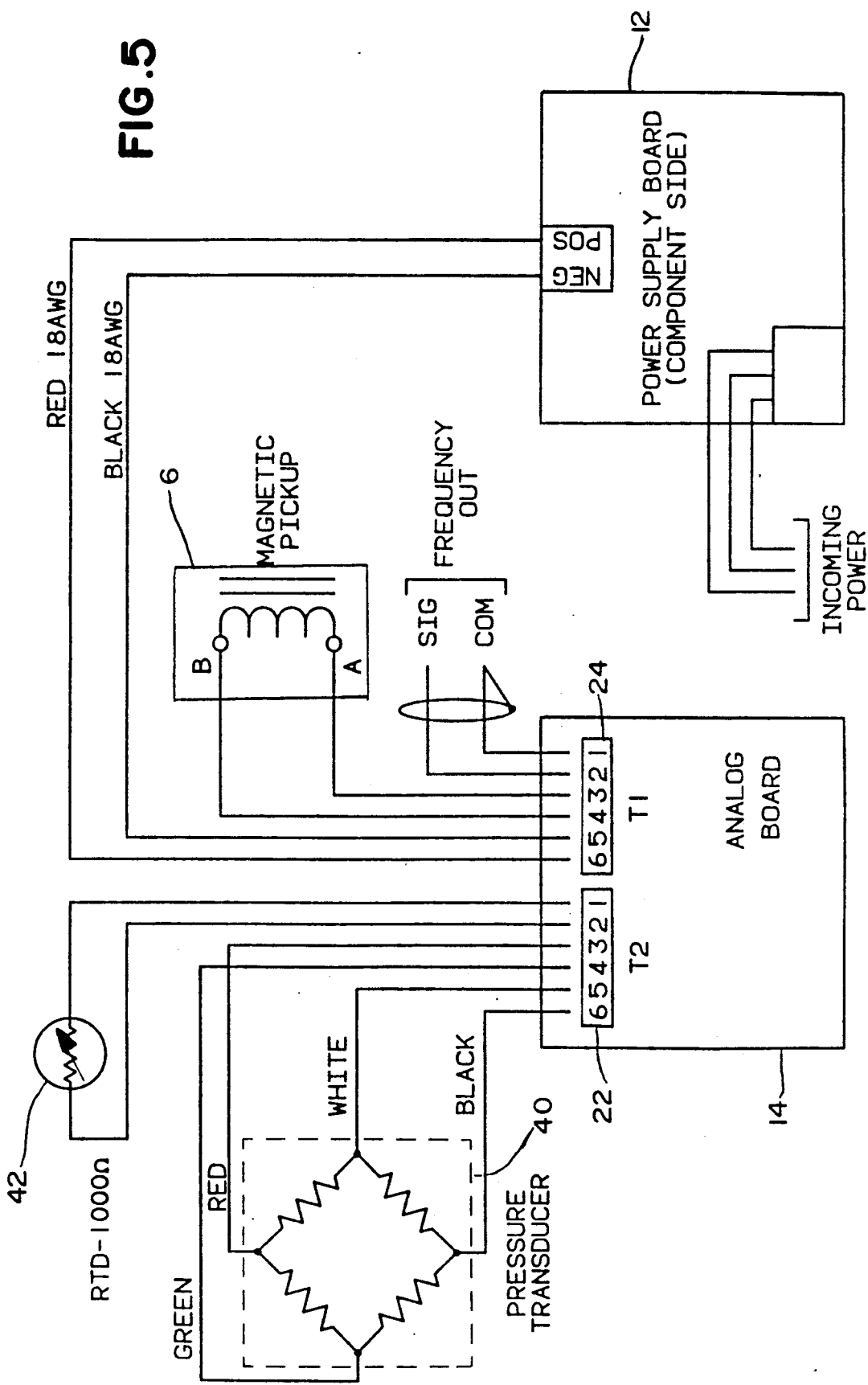

COMPENSATED TURBINE FLOWMETER

BACKGROUND OF THE INVENTION

It is common to transport flowing gases, particularly natural gas, from an area of production to an area of consumption. The transmission of natural gas is usually accomplished by use of a pipeline through which the gas flows. It can be seen how the quantity, or volume of gas flowing through the pipeline must be determined so that the delivered amount is known.

Many types of flowmeters have been used to provide this monitoring function, including orifice meters, swirlmeters, vortexmeters meters and turbine flowmeters. Further, compensated turbine flowmeters are also known, for example, U.S. Pat. No. 3,176,514 to Foster shows a meter compensating system which inputs a pressure and temperature signal into a pressure/temperature to time converter (multivibrator) and then combines the converted signals with the output of a turbine flowmeter in a gating circuit. This combined signal is then output put to a pulse totalizer which may be a digital counter, or mechanical counter, when low frequency pulses are output. U.S. Pat. No. 3,537,312 to Moore shows pressure, temperature and turbine flowmeter inputs. The pressure and temperature signal voltages are compared with a ramp voltage and if the temperature voltage equals ramp voltage a pulse is fed to a gate circuit, thereby opening the gate. The flowmeter signals are allowed to pass when the gate circuit is open and are then fed into a counter and display. Cornforth (U.S. Pat. No. 4,390,956) is a gas flow volume corrector which utilizes temperature and pressure inputs, an uncorrected value for the volume of flowing gas, and a set of constants derived from base (temperature and pressure) conditions and gas content in a series of calculations to determine the supercompressibility factor and in turn a corrected volume. None of the aforementioned references provide a frequency signal usable in a variety of interfaces, such as remote terminal units (RTU) and personal, or system computers. Furthermore, these prior art references do not include any means for verifying the actual line parameters, i.e. raw temperature, pressure and actual volume flow rate values which can be used to confirm that the correct compensated volume is being output.

SUMMARY OF THE INVENTION

In contrast to the prior art, the present invention includes a circuit which outputs a frequency signal which is compatible with a variety of readout instruments or peripheral computer devices, such as displays and RTUs. Further, output signals are provided which are representative of the gas pipeline parameters.

The present invention provides an output of volume flow of gas through a pipeline which may be referenced to standard conditions, such as 60° F. and 14.73 psi. Pressure, temperature and flow sensors are provided in close proximity to each other thereby accurately detecting these conditions at a single point in the line. The flowmeter then electronically compensates the flow signal and outputs a frequency signal usable by a plurality of peripheral devices. Further, the compensated output of the present invention can be verified on site by maintenance personnel since uncompensated pressure, temperature and flow can be obtained. The compensated flowmeter of the present invention is also geographically flexible in that a remote power supply unit can be added which provides a virtually perpetual source of electric power.

In accordance with the previous summary, objects, features and advantages of the present invention will become apparent to one skilled in the art from the subsequent description and the appended claims taken in conjunction with the accompanying drawings.

BRIEF DESCRIPTION OF THE DRAWINGS

FIG. 1 is a top plan view of the housing for the electronic assemblies showing the various circuit cards;

FIG. 2 is an exploded front elevational view of the compensated flow meter of the present invention illustrating its connection into a gas pipeline;

FIG. 3 is a front elevational view of the present invention fully connected into the pipeline;

FIG. 5 is a schematic diagram illustrating the electrical wiring connections for the compensated flow meter of the present invention;

DETAILED DESCRIPTION OF THE PREFERRED EMBODIMENTS

Figure 4:
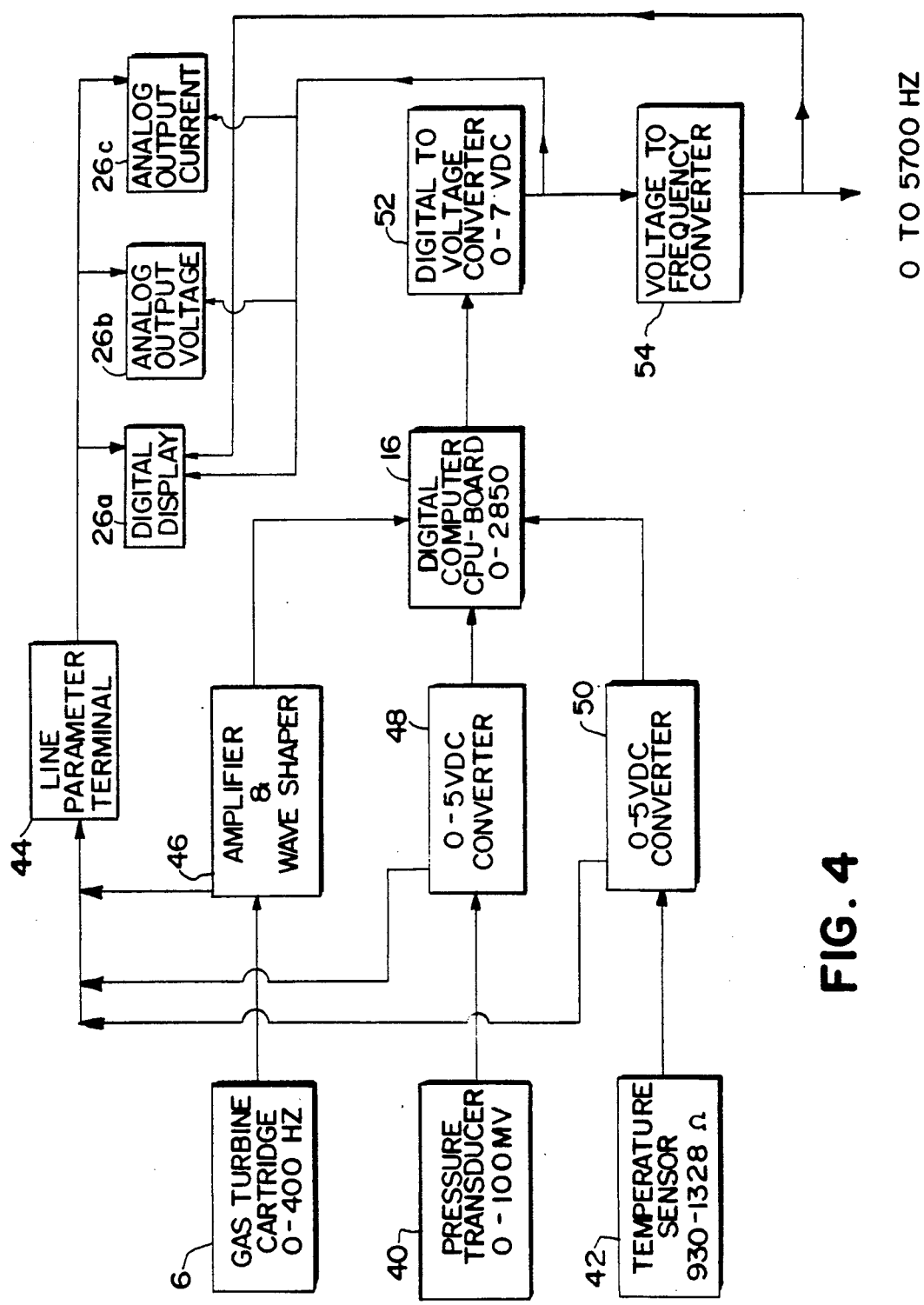
FIG. 4 is a block diagram showing the process whereby the temperature, pressure and flow inputs are compensated to a standard volume and output to peripheral devices.

The present invention will now be described with reference to the drawings. In particular, FIG. 1 shows the arrangement of the specific circuit cards in a weather proof housing 10. A power supply card 12 and analog board 14 are shown and their operation will be described below. A controller, or processor 16 (CPU), of a type that is commercially available, performs the actual compensation process from raw sensor inputs to a standard gas volume. A temperature transducer 42, pressure transducer 40, and turbine flow meter cartridge 6 are housed within the flow meter 8 (FIG. 2) and positioned below the weatherproof housing 10. The temperature and pressure signals are routed from within housing 10 to terminal block 22. Likewise, the turbine meter cartridge signal is routed to terminal block 24. The power source is input to housing 10 through conduit hub 20 (FIGS. 2 and 3) and terminated at power supply card 12. The compensated digital frequency signal is supplied from terminal block 24 and output to housing 10 through conduit hub 18 where connection is made to readout instrumentation. Further optional circuit boards 26, discussed below, are disposed within housing 10, as shown. It should be noted that all of the available optional boards will be designated with the reference numeral 26 and that optional boards 26 may be disposed within different physical locations in housing 10 depending upon the option selected.

FIGS. 2 and 3 illustrate the mechanical connections required to insert a flow meter 8 into a pipeline 28. A lid 11 is tightened onto the top of housing 10, thereby providing the aforementioned weather proof enclosure. It can be seen how flanges 30, which are affixed to pipeline 28, can be bolted together using threaded rods 32 and nuts 34. An elastromeric seal 35 is placed between flange 30 and the input 36, and output 38, of the flow meter body 8. The resiliency of seal 35 provides a fluid (gas) tight seal between turbine flowmeter 6 and flange 30, as nuts 34 are tightened onto threaded rods 32. Next, FIG. 3 depicts the identical components shown in the exploded view of FIG. 2 but after being physically connected together, as described above.

FIG. 4 is a block diagram illustrating the volume compensation process of the present invention. Uncompensated sensor inputs are generated using pressure transducer 40, temperature transducer 42 and turbine flow meter cartridge 6. It should be noted that different combinations of pressure transducers 40 and turbine flow meter cartridges 6 can be utilized depending on the pressure ranges, volumes and flow characteristics of the pipeline to be monitored. A pressure transducer range switch (not shown) is provided on analog board 14 and is used to select the rating of the corresponding pressure transducer 40 utilized in each specific application.

Next, the sensor inputs are processed prior to being input to CPU 16. A commercially available amplifier and wave shaper 46, amplifies the digital signal output from flow meter cartridge 6. Converter 48 amplifies and changes a 0 to 100 millivolt output from pressure transducer 40, to a 0 to 5 volt dc signal. Similarly, converter 50 amplifies and transforms a 930 to 1328 ohm signal from temperature transducer 42 into a 0 to 5 volt dc signal. Both converters 48 and 50 include commercially available circuit components. All three signals from amplifier 46, converter 48 and converter 50 are input to CPU 16, wherein a conversion calculation is performed (based upon software characterized by the flow chart of FIG. 8) and a pressure and temperature compensated digital signal is output. The present invention is capable of accomodating an extremely wide gas flow range making it very versatile. This feature is due in part to a scaler switch (not shown) located on CPU board 16 which provides a divide by 10 feature. For low to medium flow rates the X1 position is used, however if a large flow rate is contemplated the X.1 (divide by 10) position can be selected, thereby increasing the flow rate readable by the present invention by a factor of ten. As is known in the art, CPU 16 uses a plurality of data and memory buffers to store, and then look up, the uncompensated line parameter values (flow, temperature and pressure) while implementing the algorithm used to determine the gas flow rate under standard conditions. Additionally, the uncompensated inputs can be read "as is" by utilizing a line parameter terminal 44 and optional boards 26, discussed below. Line parameter terminal 44 is a connector of a type known in the art that allows a connected board to read any or all of the uncompensated line parameter values. In this manner, the uncompensated line parameters can be used by maintenance personnel to verify that the standard volume output is correct. A standard hand held calculator, or personal computer, and the ideal gas law is all that is required. The ideal gas law is as follows:

PV = MRT where
P = pressure
V = volume
M = mass of gas in moles
R = constant
T = temperature.

Digital to voltage converter 52 is commercially available and produces a 0 to 7 volt dc signal based upon the compensated digital signal output from CPU 16. The voltage signal output from converter 52 represents the compensated gas flow rate. This voltage is available to one or all of the optional circuit boards 26a, 26b, or 26c. The voltage signal output from converter 52 is also input to a voltage to frequency converter 54 which outputs a 0 to 5700 Hz signal. This signal is made up of digital pulses suitable for direct connection to a pluralrity of commercially available readout instruments or may be fed to optional board 26.

The type of optional board 26 is dependent on the application of the compensated flow meter of the present invention. For example, a digital display 26a can be chosen which will allow on site viewing of the compensated flow volume. The digital display 26a, includes two LCD displays or other suitable digital displays, such as LEDs which are known in the art, capable of showing up to six digits. The frequency signal from converter 54 is input to display 26a wherein one LCD display can be used for totalizing accumulated volume while the other LCD display can be used for monitoring current conditions. Further, the aforementioned line parameters of uncompensated temperature, pressure and flow are displayed via a connection between display 26a and line parameter terminal 44. Additionally, a modified lid 11 must be used with this option to permit on site viewing of the two LCD displays. Thus, it can be seen that the digital display option 26a will be utilized when the operator desires on site readings of the line parameters, total compensated volume and current compensated flow to be available.

The analog output-voltage option 26b provides three nonisolated voltage outputs representing temperature, pressure and instantaneous flow rate. The temperature signal is 0 to 5 volts dc and corresponds to 0° to 185° F., whereas the pressure signal is 0 to 5 volts dc and represents 0 PSIA (one atmosphere; 14.73 psi) up to the maximum rated pressure of the pressure transducer. The flow rate signal is from 0 to 7 volts dc and corresponds to 0 to the maximum flow rate capability of turbine flow meter cartridge 6. The temperature and pressure values are available if the connection between analog output voltage option 26b and line parameter terminal 44 is made so that the uncompensated values are available to the user via the RTU, field computer, or other interface. The turbine flow meter cartridge 6 frequency signal representing uncompensated flow under line conditions is also input to analog output-voltage option 26b and is available to the operator. As shown in FIG. 4, the uncompensated signals used in the embodiments described herein are those from the conditioning elements 46, 48, 50.

The analog output-current option 26c provides three fully isolated ·4 to 20 milliamp current loops. These loops represent temperature, pressure and flow. The temperature signal represents 0° to 185° F. over the 4 to 20 mA range and the pressure loop represents 0 PSIA to the maximum pressure rating of the pressure transducer utilized. The flow rate loop ranges from 4 to 20 mA and corresponds to 0 to the maximum flow rate conditions determined by the rating of the pressure transducer and turbine flow meter cartridge 6 used. Again, a connection to line parameter-terminal 44, as shown in FIG. 4 will allow the temperature and pressure line parameter values to be obtained, along with the uncompensated frequency signal from turbine flow meter cartridge 6. These values are then output to the corresponding interface device, such as an RTU, field computer or system computer, and are in usable form for the pipeline operator.

FIG. 5 shows the electrical wiring connections between the various components of the compensated flow meter 10 of the present invention. As can be seen, the sensor outputs from pressure transducer 40 and temperature transducer 42 are input to terminal block 22 of analog board 14. Similarly, the sensor signal from turbine flow meter cartridge 6 and electrical power from power supply board 12 are input to terminal block 24 of analog board 24. The frequency signal, which represents the compensated flow rate is output from terminal block 24 and then connected to the desired readout instrument or to optional board 26a.

The compensated flow meter of the present invention is capable of operating using a variety of different electrical power sources For example, AC power (110v or 230v) can be used and input to power supply board 12 as shown on FIG. 5. Additionally, 5, 12, or 24 volt dc power can be used and the power input directly to a corresponding power supply board 12.

Figure 7:
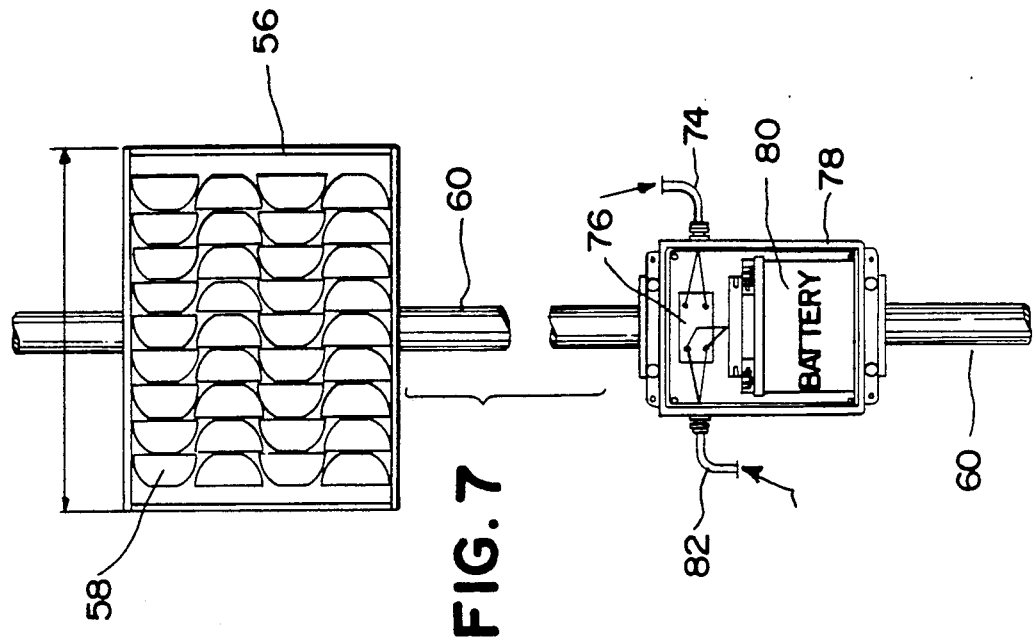
FIG. 7 is a front elevation of the solar panel, and a battery housing used in conjunction with the solar panel.
Figure 6:
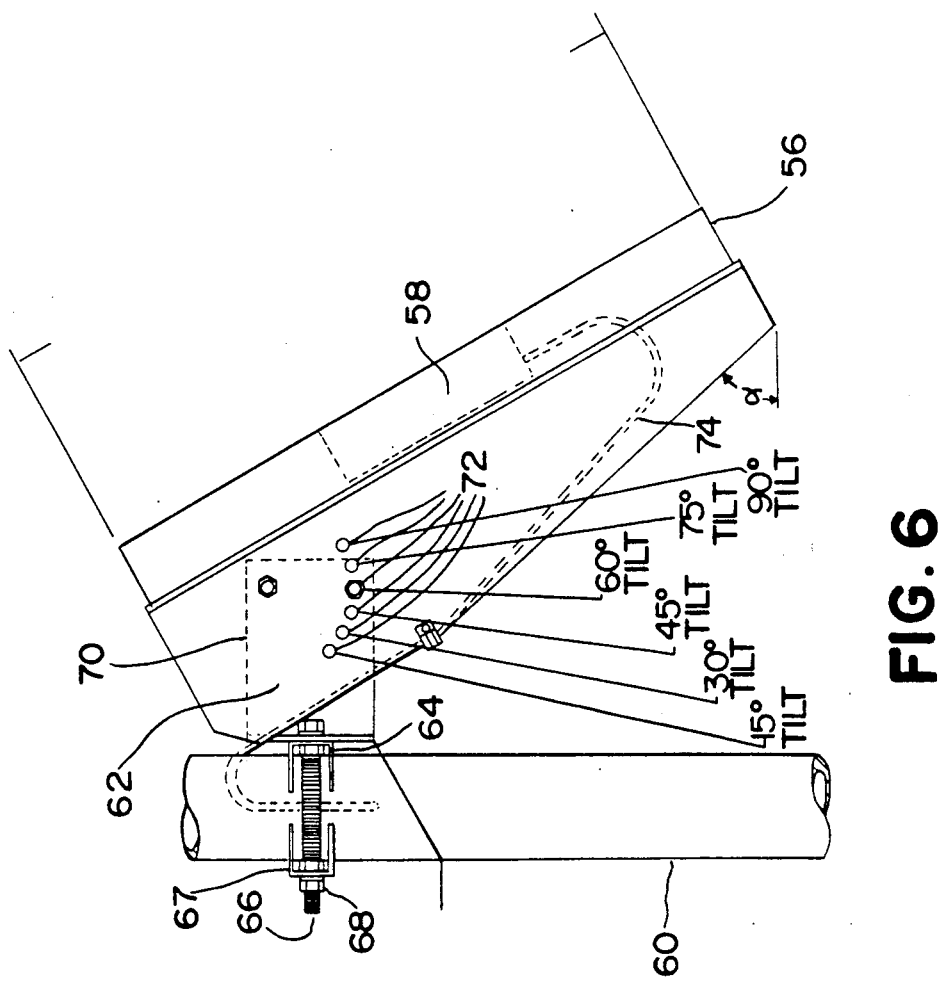
FIG. 6 is a side elevational view of a solar panel used for providing electrical power to the present invention in remote locations.

Another power source which may be utilized by the present invention is solar power option utilizing a solar panel 56 and associated equipment, as shown in FIGS. 6 and 7. A plurality of photo-voltaic type solar cells 58 are included within panel 56. These cells convert light energy into electrical energy, as is known in the art. The panel 56 is adjustably affixed to a pipe 60 using a bracket assembly 62 including spacers 64, threaded rod 66 and nuts 68. A plate 70 includes a plurality of holes 72 which allow panel 56 to be adjusted in order to set panel 56 at an optinum angle for receiving the maximum amount of sunlight. The electrical power is then input to a lead 74 which is connected to a terminal block 76 disposed within a housing 78. Battery 80 stores the electrical power for use during cloudy days and at night. The battery 80 used in this embodiment is 12 volts dc, commercially available and capable of storing enough electric power to allow the compensated flow meter of the present invention to operate for at least 10 consecutive days. Battery 80 and solar cells 58 are parallel connected and a second lead 82 transmits the electrical power to flow meter 10.

Figure 8:
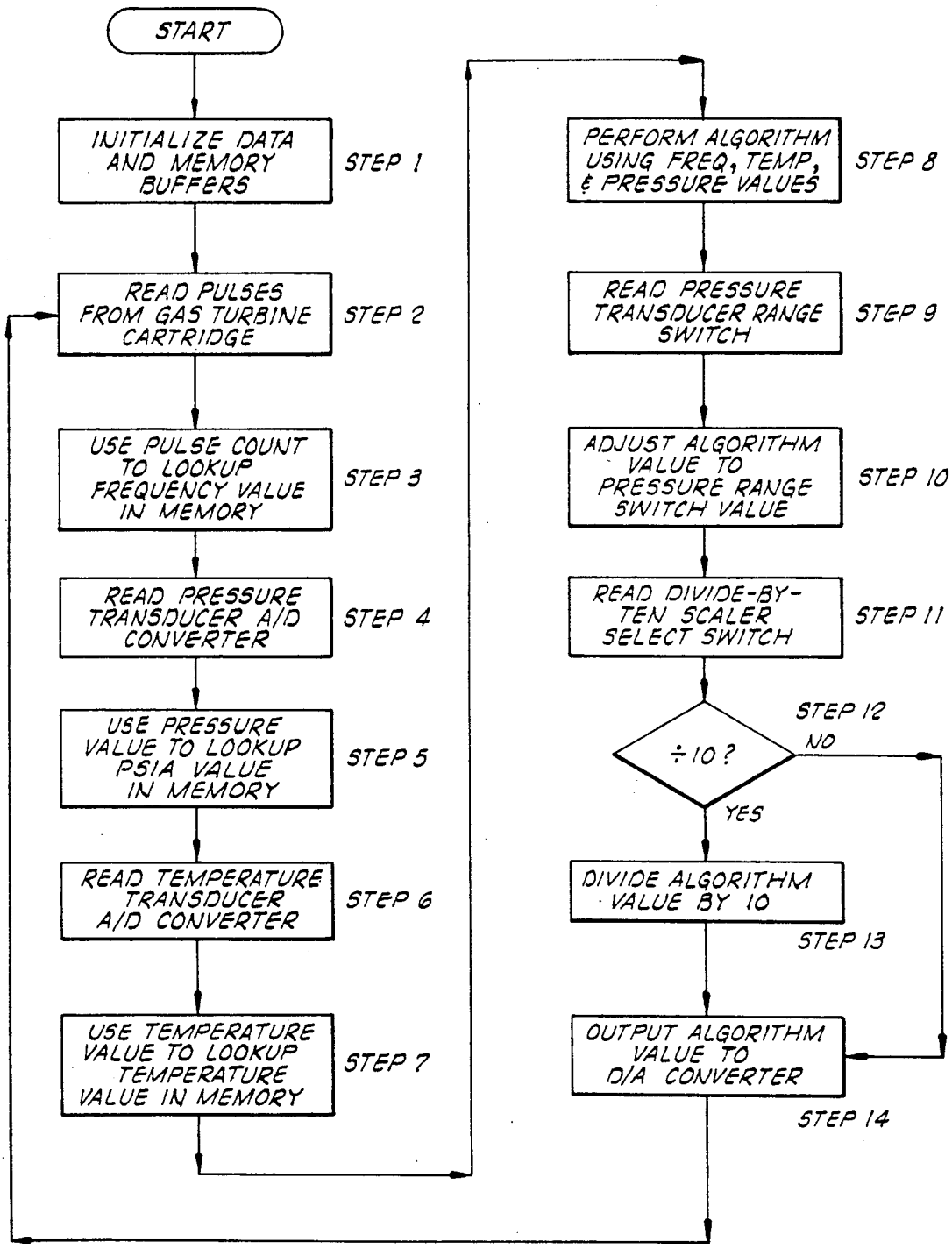
FIG. 8 is a flow chart representing the steps used by a processor to compensate the raw pressure, temperature and flow values into a standard volume.

CPU 16 receives uncompensated pressure, temperature and flow sensor inputs and applies an algorithm which calculates the compensated volume at standard conditions, based on these inputs. FIG. 8 is a flow chart illustrating the steps of the program used by CPU 16 in determining the compensated volume, which will now be described.

At step 1 the program initializes the data and memory buffers used to store the uncompensated values. Next, the uncompensated output pulses from turbine flow meter cartridge 6 are read at step 2. These pulses are then used at step 3 to look up the frequency value which is stored in the memory. The system then proceeds to step 4 where the uncompensated pressure is read from the analog to digital converter 48 and at step 5 this value is used to look up a corresponding standard pressure value. Step 6 reads the uncompensated temperature signal from analog to digital converter 50 which is used at step 7 to look up a corresponding standard temperature value stored in memory.

At step 8 the flow, temperature and pressure values which have been previously "looked up" are used to calculate the compensated flow rate using an algorithm derived from the ideal gas law, as discussed above.

The position of the pressure transducer switch is then read at step 9, allowing the program to determine which pressure transducer 42 and flow meter 6 combination, and the corresponding range of pressures are being used. Step 10 then adjusts the algorithm to take into account the pressure range indicated by the switch at step 9. The scaler switch position is then read at step 11, and step 12 determines whether the algorithm value (compensated flow rate) should be divided by 10. If yes, step 13 actually divides the compensated flow output by a factor of 10, and then proceeds to step 14 where the compensated value is output to the digital to analog converter 52. Conversely, if the scaler switch is not in the divide by 10 position, then the system proceeds directly to step 14. After step 14, the program then returns to step 2 and reads the uncompensated flow output pulses from the turbine flow meter cartridge 6 and once again proceeds through the aforementioned steps 2–14.

Although certain preferred embodiments have been shown and described, it should be noted that many changes and modifications may be made therein without departing from the scope of the appended claims.

What is claimed is:

1. An apparatus for determining a flow rate of gas at standard conditions, said apparatus comprising:

turbine flow meter means for sensing gas flow rate and outputting an uncompensated flow rate signal based thereupon;

temperature sensing means for providing an uncompensated temperature signal, based upon a temperature of said gas;

pressure sensing means for providing an uncompensated pressure signal, based upon a pressure of said gas;

processing means for receiving said uncompensated flow rate signal, said uncompensated temperature signal and said uncompensated pressure signal, for determining the flow rate of said gas in standard units, and for outputting a digital signal based upon said uncompensated signals and representative of said standard flow rate;

first conversion means for converting said digital signal into a voltage signal representative of said standard flow rate;

second conversion means for converting said voltage signal into a frequency signal representative of said standard flow rate;

a housing having said processing means, said first conversion means and said second conversion means disposed therein, said housing connected to said turbine flow meter means; and at least one output means, disposed in said housing, for outputting signals in response to each of said uncompensated signals and for outputting a signal in response to at least one of said voltage signal and said frequency signal, wherein said at least one output means is selected from among the group consisting of:

digital display means, responsive to said frequency signal and said uncompensated signals, for allowing said standard flow rate and a value corresponding to each of said uncompensated signals to be locally monitored;

voltage analog output means, responsive to said voltage signal and said uncompensated signals, for transmitting said standard flow rate and a value corresponding to each of said uncompensated signals to a compatible remote interface unit; and current analog output means, responsive to said voltage signal and said uncompensated signals, for transmitting said standard flow rate and a value corresponding to each of said uncompensated signals to a compatible remote interface unit.

2. An apparatus for determining a flow rate of gas at standard conditions, said apparatus comprising:

a flow meter body adapted to be connected into a pipeline;

turbine flow meter means for sensing flow rate of gas in the pipeline and outputting an uncompensated flow rate signal based thereupon, said flow meter means including a turbine flow meter cartridge housed in said flow meter body;

temperature sensing means for providing an uncompensated temperature signal based upon a temperature of gas in the pipeline, said temperature sensing means including a temperature transducer housed in said flow meter body;

pressure sensing means for providing an uncompensated pressure signal based upon a pressure of gas in the pipeline, said pressure sensing means including a pressure transducer housing in said flow meter body;

a housing mounted on said flow meter body;

processing means, disposed in said housing, for receiving said uncompensated flow rate signal, said uncompensated temperature signal and said uncompensated pressure signal, for determining the flow rate of said gas in standard units, and for outputting a digital signal representative of said standard flow rate;

first conversion means, disposed in said housing, for converting said digital signal into a voltage signal representative of said standard flow rate;

second conversion means, disposed in said housing, for converting said digital signal into a voltage signal representative of said standard flow rate;

output means, disposed in said housing, for providing selected output interface signals in response to selected ones of said uncompensated signals, said voltage signal and said frequency signal, wherein said output means includes at least one interface selected from among the group comprising:

digital display means, responsive to said frequency signal and said uncompensated signals, for allowing said standard flow rate and a value corresponding to each of said uncompensated signals to be locally monitored;

voltage analog output means, responsive to said voltage signal and said uncompensated signals, for transmitting said standard flow rate and a value corresponding to each of said uncompensated signals to a compatible remote interface unit; and current analog output means, responsive to said voltage signal and said uncompensated signals, for transmitting said standard flow rate and a value corresponding to each of said uncompensated signals to a compatible remote interface unit.

* * * * *